United States Patent
Wood et al.

(10) Patent No.: US 10,358,019 B1
(45) Date of Patent: Jul. 23, 2019

(54) RECREATIONAL VEHICLE ESCAPE SLIDE ASSEMBLY

(71) Applicants: Clint Wood, Chaska, MN (US); Gabriel Anthony Sena, Sr., Lake Havasu, AZ (US)

(72) Inventors: Clint Wood, Chaska, MN (US); Gabriel Anthony Sena, Sr., Lake Havasu, AZ (US)

( * ) Notice: Subject to any disclaimer, the term of this patent is extended or adjusted under 35 U.S.C. 154(b) by 0 days.

(21) Appl. No.: 16/111,310

(22) Filed: Aug. 24, 2018

(51) Int. Cl.
*B65G 11/14* (2006.01)
*B60J 5/04* (2006.01)
*E05B 65/10* (2006.01)
*G08B 17/103* (2006.01)
*B60J 9/02* (2006.01)

(52) U.S. Cl.
CPC ............ *B60J 9/02* (2013.01); *B65G 11/14* (2013.01); *E05B 65/1033* (2013.01); *B60J 5/0468* (2013.01); *B60J 5/0486* (2013.01); *G08B 17/103* (2013.01)

(58) Field of Classification Search
CPC ......... B65G 11/10; B65G 11/14; E04H 15/06; E04H 15/32; B60R 3/02; E06C 5/04; A62B 1/20; G08B 25/12; B63B 2027/145; B64D 25/14
USPC ................................ 193/25 R, 25 B, 25 C
See application file for complete search history.

(56) References Cited

U.S. PATENT DOCUMENTS

| | | | | |
|---|---|---|---|---|
| 3,656,579 A | * | 4/1972 | Fisher | B64D 25/14 182/48 |
| 3,676,954 A | * | 7/1972 | Rapport | E05B 65/1033 49/141 |
| D252,197 S | | 6/1979 | Gale | |
| 5,975,167 A | * | 11/1999 | Brown | A01D 34/535 144/218 |
| 6,173,812 B1 | * | 1/2001 | Spivey | B60R 3/02 182/88 |
| 6,536,715 B1 | * | 3/2003 | Moran | B64D 25/14 182/48 |
| 6,860,494 B1 | | 3/2005 | Chisholm | |
| 7,213,829 B2 | | 5/2007 | Wu | |
| 7,467,764 B2 | * | 12/2008 | Hintzman | B64D 25/14 182/48 |
| 7,971,898 B2 | | 7/2011 | Wise | |
| 8,505,960 B1 | | 8/2013 | Shindelar | |
| 8,662,506 B2 | | 3/2014 | Bengtzen | |
| 2009/0145338 A1 | | 6/2009 | Panosian | |
| 2009/0152046 A1 | * | 6/2009 | Stewart | B60R 3/02 182/127 |

(Continued)

*Primary Examiner* — James R Bidwell

(57) ABSTRACT

A recreational vehicle escape slide assembly includes a recreational vehicle that has an emergency exit window. The emergency exit window has a opening mechanism for opening the emergency exit vehicle. A slide unit is coupled to the recreational vehicle and the slide unit is aligned with the emergency exit window. The slide unit is inflated into a deployed position when the emergency exit window is opened to safely transport a user to the ground in the event of an emergency. An inflation unit is coupled to the recreational vehicle and the inflation unit is operationally coupled to the opening mechanism of the emergency exit window. The inflation unit is in fluid communication with the slide unit. The inflation unit is turned on to inflate the slide unit when the opening mechanism opens the emergency exit window.

8 Claims, 4 Drawing Sheets

(56) References Cited

U.S. PATENT DOCUMENTS

2009/0261616 A1* 10/2009 Young .................... B60P 3/343
  296/136.01
2016/0332292 A1 11/2016 Cheff et al.

* cited by examiner

RECREATIONAL VEHICLE ESCAPE SLIDE ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to escape slide devices and more particularly pertains to a new escape slide device for safely exiting an emergency exit window in a recreational vehicle.

BRIEF SUMMARY OF THE INVENTION

An embodiment of the disclosure meets the needs presented above by generally comprising a recreational vehicle that has an emergency exit window. The emergency exit window has a opening mechanism for opening the emergency exit vehicle. A slide unit is coupled to the recreational vehicle and the slide unit is aligned with the emergency exit window. The slide unit is inflated into a deployed position when the emergency exit window is opened to safely transport a user to the ground in the event of an emergency. An inflation unit is coupled to the recreational vehicle and the inflation unit is operationally coupled to the opening mechanism of the emergency exit window. The inflation unit is in fluid communication with the slide unit. The inflation unit is turned on to inflate the slide unit when the opening mechanism opens the emergency exit window.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
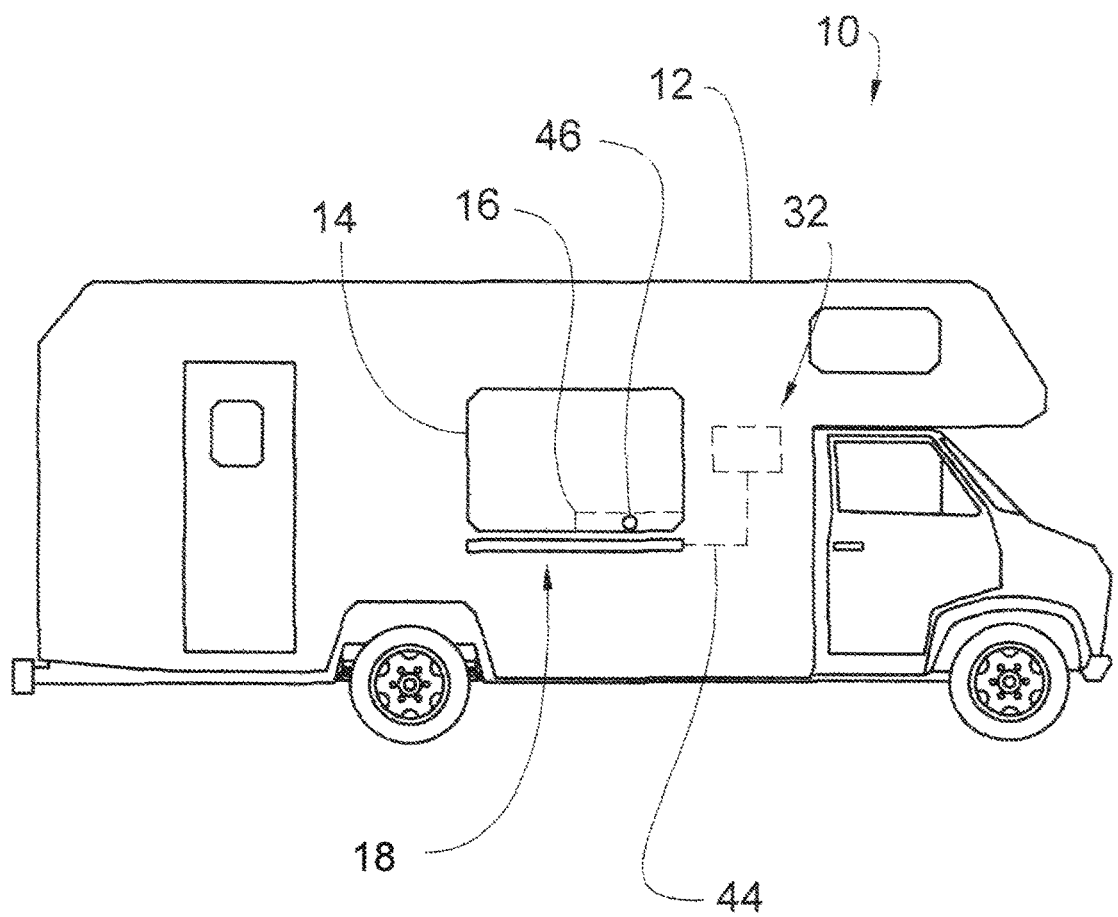
FIG. 1 is a phantom perspective view of a recreational vehicle escape slide assembly according to an embodiment of the disclosure.
Figure 2:
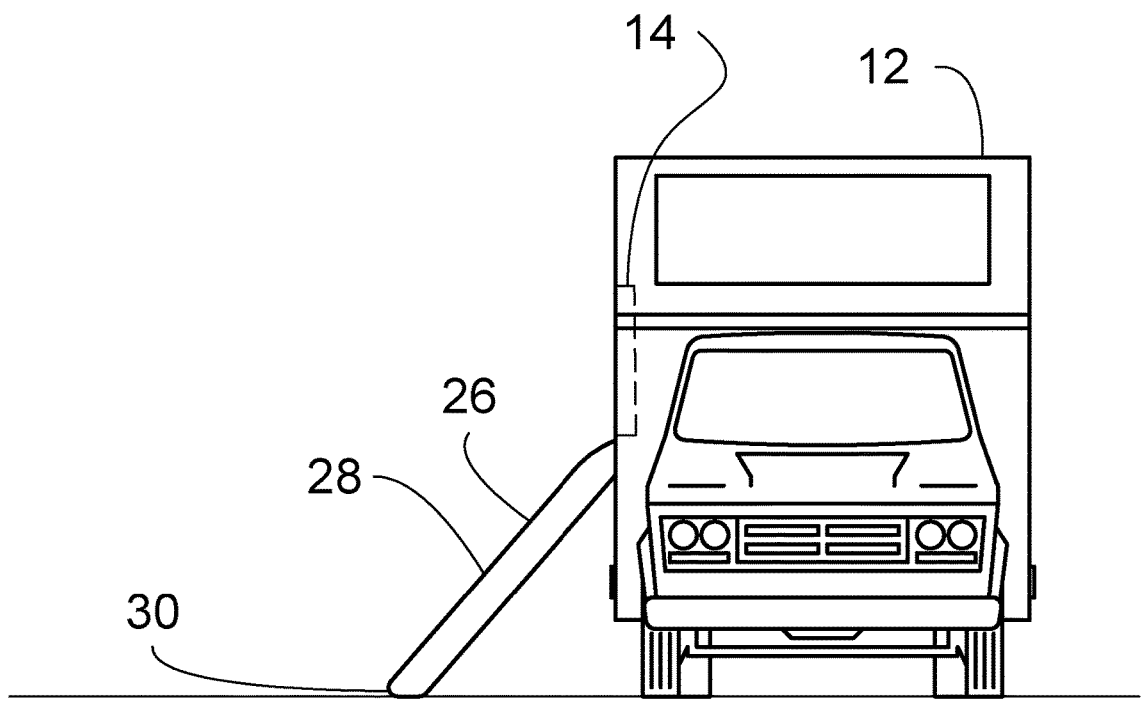
FIG. 2 is a perspective in-use view of an embodiment of the disclosure showing an evacuation slide being deployed.
Figure 3:
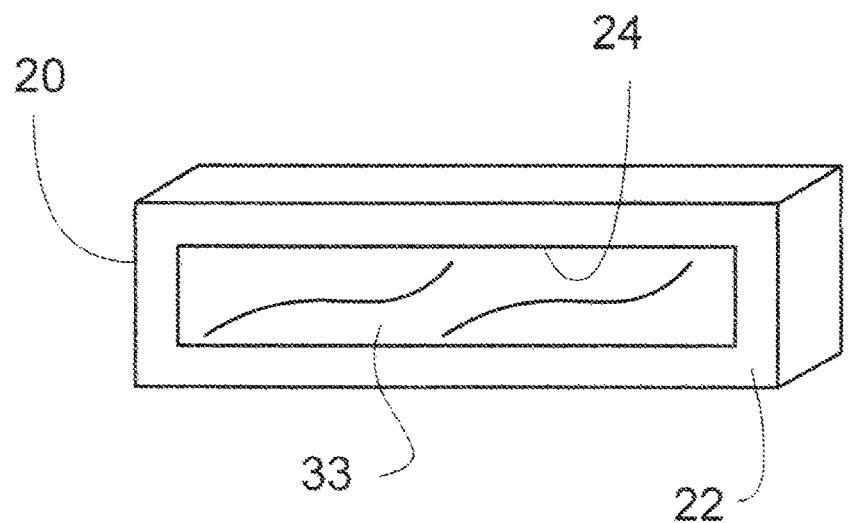
FIG. 3 is a front perspective view of a housing of an embodiment of the disclosure.
Figure 4:
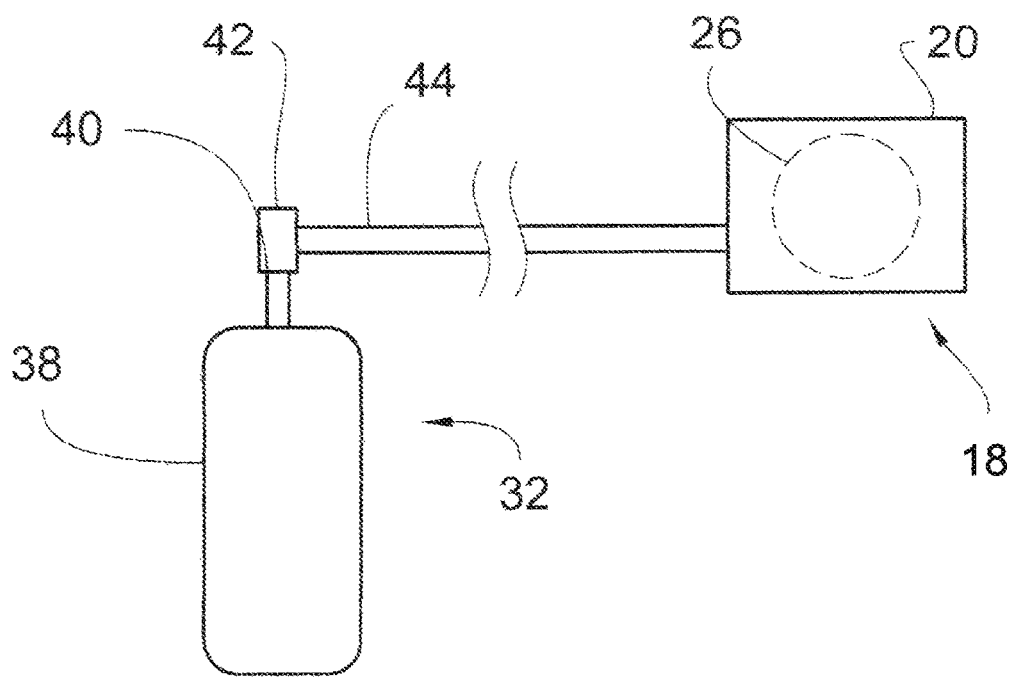
FIG. 4 is a perspective view of a slide unit and an inflation unit of an embodiment of the disclosure.
Figure 5:
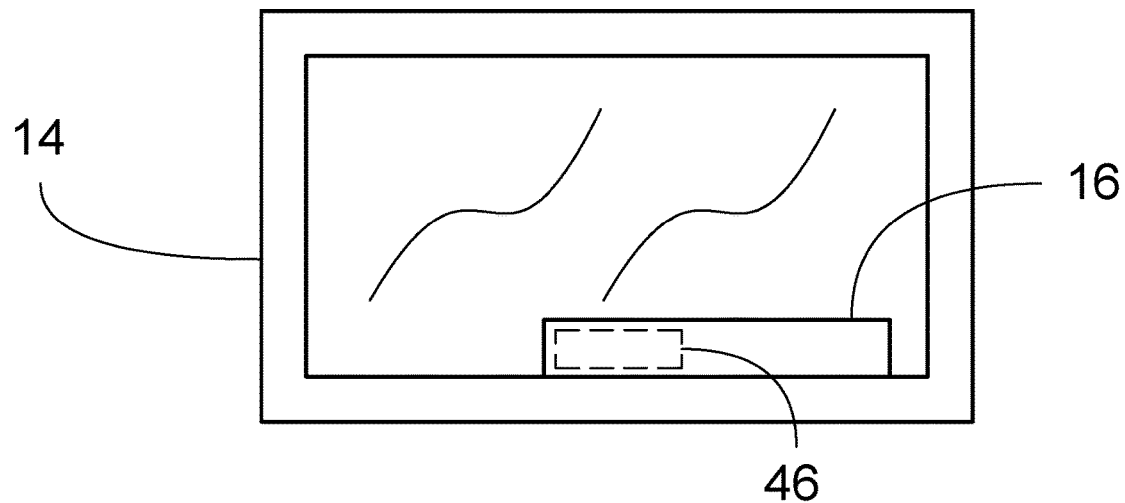
FIG. 5 is a front view of an emergency exit window of an embodiment of the disclosure.
Figure 6:
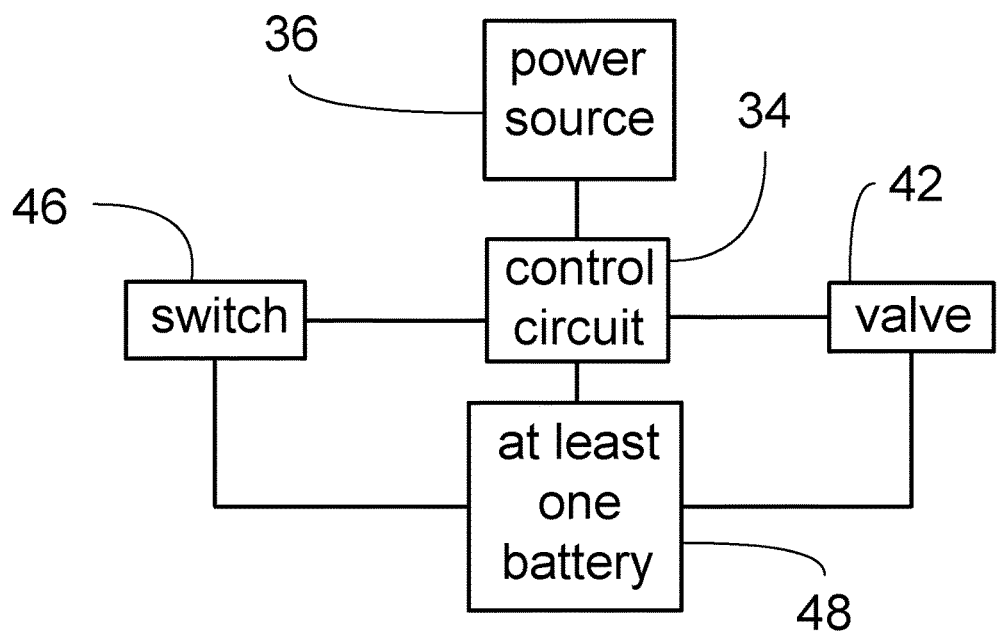
FIG. 6 is a schematic view of an embodiment of the disclosure.

With reference now to the drawings, and in particular to FIGS. 1 through 6 thereof, a new escape slide device embodying the principles and concepts of an embodiment of the disclosure and generally designated by the reference numeral 10 will be described.

As best illustrated in FIGS. 1 through 6, the recreational vehicle escape slide assembly 10 generally comprises a recreational vehicle 12 that has an emergency exit window 14. The emergency exit window 14 has an opening mechanism 16 for opening the emergency exit window 14. The recreational vehicle 12 may be a class A motor home, a class B motor home, a class C motor home and any other type of motorized camper. Moreover, the recreational vehicle 12 may be a tow behind camper of any conventional size and design. The opening mechanism 16 may be a manual window release, an automatic electronic window release that includes smoke detectors or any other type of emergency window opening mechanism used on campers. The opening mechanism 16 may include an electro-mechanical actuator that is turned on when the smoke detectors detect smoke. Thus, the emergency exit window 14 may be automatically opened in the event of a fire.

A slide unit 18 is coupled to the recreational vehicle 12 and the slide unit 18 is aligned with the emergency exit window 14. The slide unit 18 is inflated into a deployed position when the emergency exit window 14 is opened having the slide unit 18 angling downwardly between the emergency exit window 14 and the ground. Thus, the slide unit 18 can safely transport a user to the ground in the event of an emergency. The slide unit 18 is particularly useful for protecting elderly campers, physically disabled campers and other individuals at risk of injury from being injured due to jumping out of the emergency exit window 14.

The slide unit 18 comprises a housing 20 that is coupled to the recreational vehicle 12. The housing 20 is aligned with and is positioned beneath the emergency exit window 14. The housing 20 has an exit wall 22, the exit wall 22 has an opening 24 extending into an interior of the housing 20 and the exit wall 22 is exposed on the recreational vehicle 12. The housing 20 may have a length that is at least equal to the width of the emergency exit window 14. Additionally, the housing 20 may be an integral component of the outer wall of the recreational vehicle 12.

An evacuation slide 26 is provided, the evacuation slide 26 is in a normally deflated state and the evacuation slide 26 is contained within the housing 20. The evacuation slide 26 bursts outwardly through the opening 24 in the exit wall 22 when the evacuation slide 26 is inflated. The evacuation slide 26 may be constructed with similar materials and in a similar design to aircraft evacuation slides. The evacuation slide 26 has a sliding surface 28 and a distal end 30 with respect to the housing 20 when the evacuation slide 26 is inflated. Additionally, the sliding surface 28 angles downwardly between the emergency exit window 14 and the ground at an angle ranging between approximately 15.0 degrees and 45.0 degrees. Thus, the user slides downwardly on the sliding surface 28 at a sufficiently slow speed when the user exits the emergency exit window 14 to avoid being injured by the ground.

An inflation unit 32 is coupled to the recreational vehicle 12 and the inflation unit 32 is operationally coupled to the opening mechanism 16 of the emergency exit window 14. The inflation unit 32 is in fluid communication with the slide unit 18. The inflation unit 32 is turned on to inflate the slide unit 18 when the opening mechanism 16 opens the emergency exit window 14. In this way the slide unit 18 is prepared for evacuation immediately after the emergency exit window 14 is opened. The opening 24 in the housing 20 has a cover 33 thereon that is destroyed when the evacuation slide 26 is inflated. The cover 33 is comprised of a fluid impermeable material to inhibit water, dirt and other contaminants from entering the housing 20.

The inflation unit 32 comprises a control circuit 34 that is coupled to the recreational vehicle 12 and the control circuit 34 is electrically coupled to a power source 36 comprising an electrical system of the recreational vehicle 12. A container 38 is provided that contains a compressed gas and the container 38 has an outlet 40. The compressed gas may be compressed nitrogen, compressed carbon dioxide, compressed air or any other inert gas commonly used to inflate evacuation slides. The container 38 may be a pressurized gas bottle or the like and the container 38 contain a volume of the compressed gas sufficient to fully inflate the evacuation slide 26 at least one time. Additionally, the compressed gas stored in the container 38 is contained at a pressure sufficient to fully inflate the evacuation slide in less than 3.0 seconds.

A valve 42 is fluidly coupled to the outlet 40 and the valve 42 is normally closed for inhibiting the compressed gas from leaving the outlet 40. The valve 42 is actuatable into an open position to facilitate the compressed gas to leave the outlet 40. The valve 42 is electrically coupled to the control circuit 34 and the valve 42 may comprise an electro-mechanical gas valve or the like. A conduit 44 is fluidly coupled between the valve 42 and the evacuation slide 26 for routing the compressed gas into the evacuation slide 26 when the valve 42 is actuated into the open position.

A switch 46 is coupled to the recreational vehicle 12 and the switch 46 engages the opening mechanism 16. The switch 46 is electrically coupled to the control circuit 34 and the switch 46 is turned on when the opening mechanism 16 opens the emergency exit window 14. The control circuit 34 receives an inflate input when the switch 46 is turned on. Moreover, the control circuit 34 actuates the valve 42 into the open position when the control circuit 34 receives the inflate input. The switch 46 may be an electronic motion sensor, a mechanical switch and any other type of electronic device that is capable of detecting when the opening mechanism 16 opens the emergency exit window 14.

The switch 46 includes at least one battery 48 and the at least one battery 48 is in electrical communication with the control circuit 34. The at least one battery 48 may comprise a high discharge capacitor or the like and the at least one battery 48 is in electrical communication with the valve 42. The at least one battery 48 does not discharge when the switch 46 is turned on and the control circuit 34 has electrical power. Alternatively, the at least one battery 48 discharges electrical current into the valve 42 when the switch 46 is turned on and the control circuit 34 does not have electrical power. In this way the evacuation slide 26 can be deployed when the recreational vehicle 12 does not have electrical power. The switch 46 facilitates the container 38 and the valve 42 to be remotely located with respect to the housing 20 and the evacuation slide 26. In this way the slide unit 18 and the inflation unit 32 can be more easily integrated into the structure of existing recreational vehicles 12 during a retro-fit. Additionally, the slide unit 18 and the inflation unit 32 can be more easily integrated into the design and factory manufacturing of new recreational vehicles 12.

In use, the switch 46 is turned on when the opening mechanism 16 opens the emergency exit window 14. The opening mechanism 16 may have been manually manipulated to open the emergency exit window 14 or the opening mechanism 16 may have been turned on automatically when the smoke detectors detect smoke. The control circuit 34 receives the inflate input and the control circuit 34 turns the valve 42 on to release the compressed gas from the container 38. The compressed gas flows through the conduit 44 and into the evacuation slide 26 to rapidly inflate the evacuation slide 26. Thus, the evacuation slide 26 bursts outwardly through the cover 33 on the opening 24 in the exit wall 22 of the housing 20 and subsequently angles downwardly toward the ground. In this way the evacuation slide 26 is positioned to facilitate the user to safely slide to the ground rather than having to jump to the ground. Thus, elderly users and other users who are prone to injury are particularly protected from being injured due to having to jump from the emergency exit window 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A recreational vehicle escape slide assembly being configured to inflatably deploy for emergency escape from a recreational vehicle, said assembly comprising:
a recreational vehicle having an emergency exit window, said emergency exit window having an opening mechanism for opening said emergency exit window;
a slide unit being coupled to said recreational vehicle, said slide unit being aligned with said emergency exit window, said slide unit being inflated into a deployed position when said emergency exit window is opened having said slide unit angling downwardly between said emergency exit window and the ground wherein said slide unit is configured to safely transport a user to the ground in the event of an emergency; and
an inflation unit being coupled to said recreational vehicle, said inflation unit being operationally coupled to said opening mechanism of said emergency exit window, said inflation unit being in fluid communication with said slide unit, said inflation unit being turned on to inflate said slide unit when said opening mechanism opens said emergency exit window.

2. The assembly according to claim 1, wherein said slide unit comprises a housing being coupled to said recreational vehicle, said housing being aligned with and being positioned beneath said emergency exit window, said housing having an exit wall, said exit wall having an opening extending into an interior of said housing, said exit wall being exposed on said recreational vehicle.

3. The assembly according to claim 2, further comprising an evacuation slide being in a normally deflated state and being contained within said housing, said evacuation slide bursting outwardly through said opening in said exit wall when said evacuation slide is inflated.

4. The assembly according to claim 3, wherein said evacuation slide has a sliding surface and a distal end with respect to said housing when said evacuation slide is inflated, said sliding surface angling downwardly between said emergency exit window and the ground at an angle ranging between approximately 15.0 degrees and 45.0 degrees wherein said sliding surface is configured to have the user slide downwardly thereon when the user exits said emergency exit window.

5. The assembly according to claim 3, wherein said inflation unit comprises:
a control circuit being coupled to said recreational vehicle, said control circuit being electrically coupled to a power source;
a container containing a compressed gas, said container having an outlet;
a valve being fluidly coupled to said outlet, said valve being normally closed for inhibiting said compressed gas from leaving said outlet, said valve being actuatable into an open position to facilitate said compressed gas to leave said outlet, said valve being electrically coupled to said control circuit; and
a conduit being fluidly coupled between said valve and said evacuation slide, said conduit routing said compressed gas into said evacuation slide when said valve is actuated into said open position.

6. The assembly according to claim 5, further comprising a switch being coupled to said recreational vehicle, said switch engaging said opening mechanism, said switch being electrically coupled to said control circuit, said switch being turned on when said opening mechanism opens said emergency exit window.

7. The assembly according to claim 6, wherein said control circuit receives an inflate input when said switch is turned on, said control circuit actuating said valve into said open position when said control circuit receives said inflate input.

8. A recreational vehicle escape slide assembly being configured to inflatably deploy for emergency escape from a recreational vehicle, said assembly comprising:
a recreational vehicle having an emergency exit window, said emergency exit window having an opening mechanism for opening said emergency exit window;
a slide unit being coupled to said recreational vehicle, said slide unit being aligned with said emergency exit window, said slide unit being inflated into a deployed position when said emergency exit window is opened having said slide unit angling downwardly between said emergency exit window and the ground wherein said slide unit is configured to safely transport a user to the ground in the event of an emergency, said slide unit comprising:
a housing being coupled to said recreational vehicle, said housing being aligned with and being positioned beneath said emergency exit window, said housing having an exit wall, said exit wall having an opening extending into an interior of said housing, said exit wall being exposed on said recreational vehicle; and
an evacuation slide being in a normally deflated state and being contained within said housing, said evacuation slide bursting outwardly through said opening in said exit wall when said evacuation slide is inflated, said evacuation slide having a sliding surface and a distal end with respect to said housing when said evacuation slide is inflated, said sliding surface angling downwardly between said emergency exit window and the ground at an angle ranging between approximately 15.0 degrees and 45.0 degrees wherein said sliding surface is configured to have the user slide downwardly thereon when the user exits said emergency exit window; and
an inflation unit being coupled to said recreational vehicle, said inflation unit being operationally coupled to said opening mechanism of said emergency exit window, said inflation unit being in fluid communication with said slide unit, said inflation unit being turned on to inflate said slide unit when said opening mechanism opens said emergency exit window, said inflation unit comprising:
a control circuit being coupled to said recreational vehicle, said control circuit being electrically coupled to a power source;
a container containing a compressed gas, said container having an outlet;
a valve being fluidly coupled to said outlet, said valve being normally closed for inhibiting said compressed gas from leaving said outlet, said valve being actuatable into an open position to facilitate said compressed gas to leave said outlet, said valve being electrically coupled to said control circuit;
a conduit being fluidly coupled between said valve and said evacuation slide, said conduit routing said compressed gas into said evacuation slide when said valve is actuated into said open position; and
a switch being coupled to said recreational vehicle, said switch engaging said opening mechanism, said switch being electrically coupled to said control circuit, said switch being turned on when said opening mechanism opens said emergency exit window, said control circuit receiving an inflate input when said switch is turned on, said control circuit actuating said valve into said open position when said control circuit receives said inflate input.

* * * * *